Jan. 28, 1964   J. P. ZAWACKI ETAL   3,119,593
FLUID SEALS
Filed June 3, 1959   4 Sheets-Sheet 1
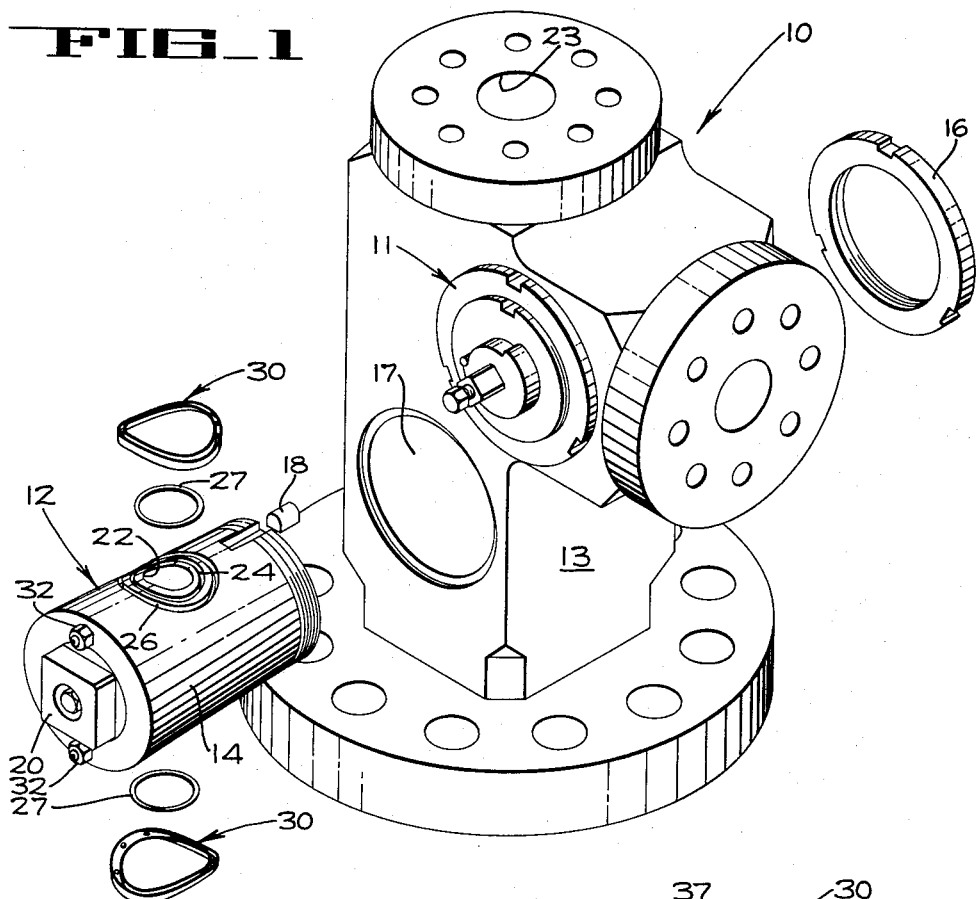
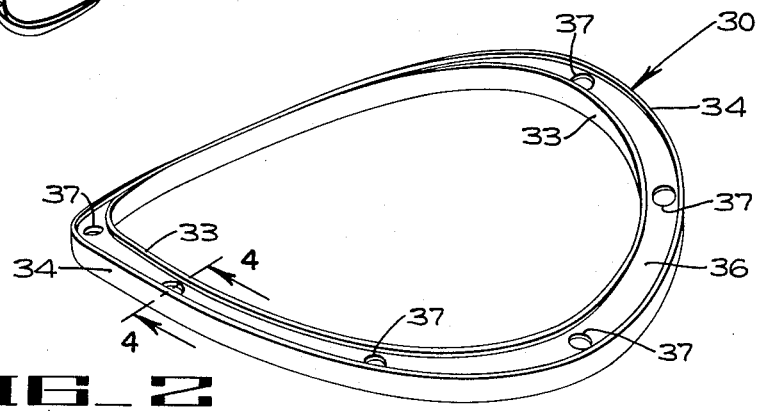
INVENTORS
JOHN P. ZAWACKI
ROY OTTER
BY Hans G. Hoffmeister
ATTORNEY

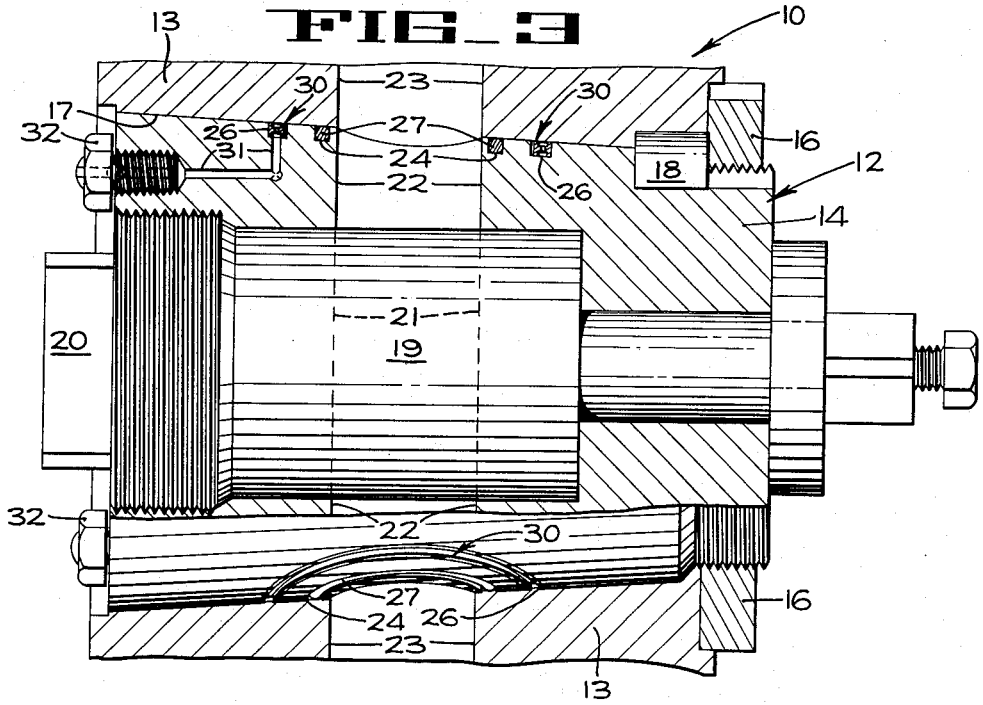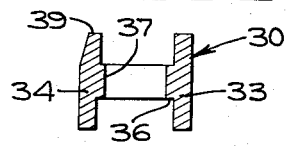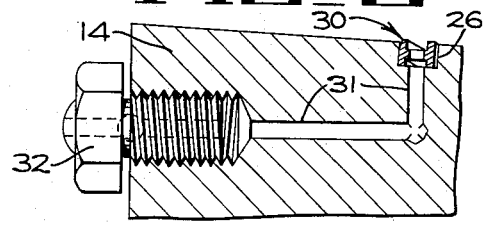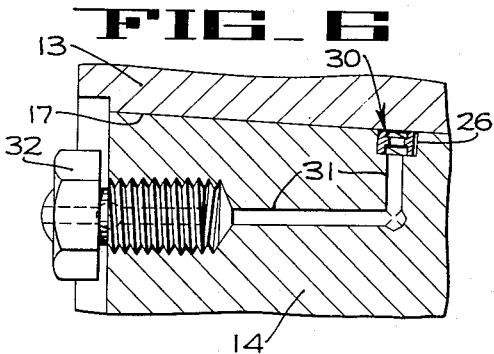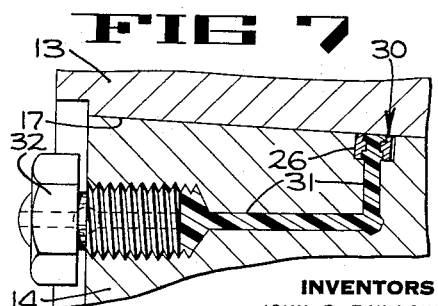
INVENTORS
JOHN P. ZAWACKI
ROY OTTER Jan. 28, 1964  J. P. ZAWACKI ETAL  3,119,593
FLUID SEALS
Filed June 3, 1959  4 Sheets-Sheet 3
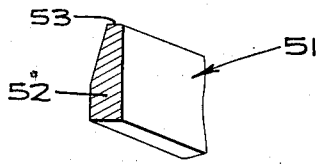
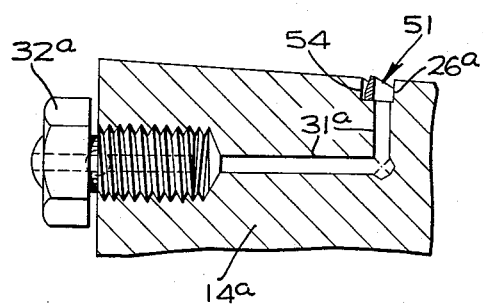
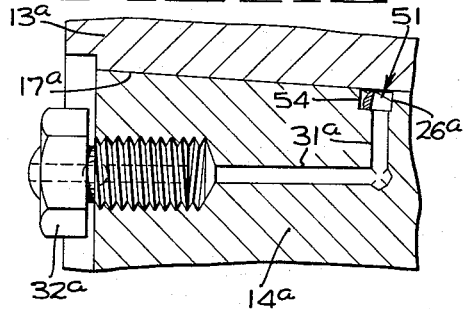
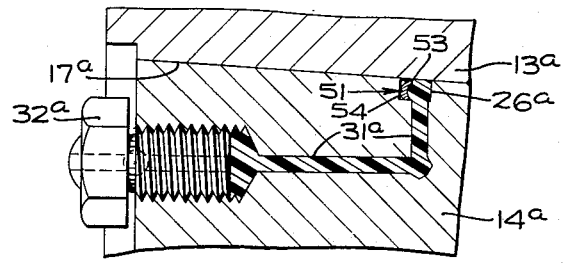
INVENTORS
JOHN P. ZAWACKI
ROY OTTER
BY *Hans G. Hoffmeister*
ATTORNEY

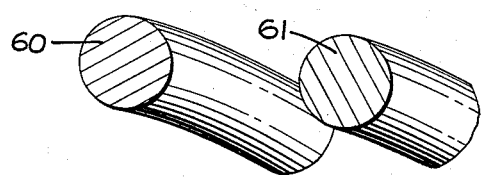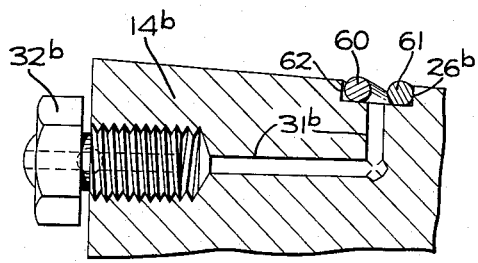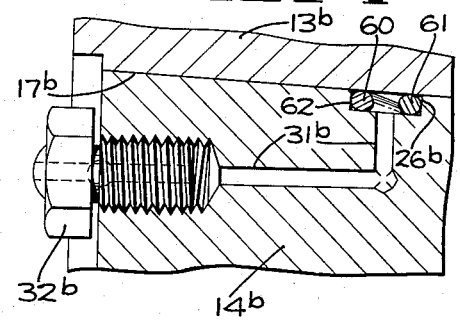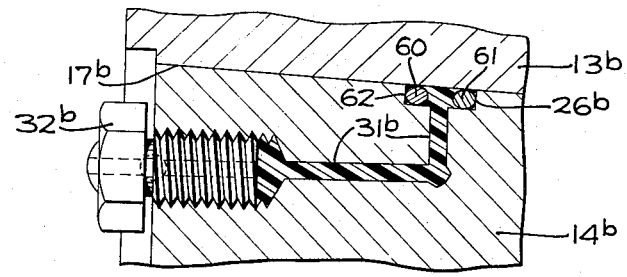

United States Patent Office 3,119,593
Patented Jan. 28, 1964

3,119,593
FLUID SEALS
John P. Zawacki and Roy Otter, Houston, Tex., assignors, by mesne assignments, to FMC Corporation, San Jose, Calif., a corporation of Delaware
Filed June 3, 1959, Ser. No. 817,764
9 Claims. (Cl. 251—171)

The present invention appertains to fluid seals and more particularly relates to apparatus for providing pressure-energized fluid seals with metal rings.

In certain high pressure fluid controlling installations, such as well head units, it is desirable to form entire valve assemblies having movable valves therein, which assemblies are keyed in the main body of the installation as plug-in units. This permits each entire valve assembly to be individually removed from the main body for purposes of inspection and repair without disturbing the remaining portion of the installation.

Fluids flowing under the influence of pressures as high as 30,000 p.s.i. are controlled by these installations and must be prevented from flowing between the valve assemblies and their mating bores in the main body.

It is therefore an object of the present invention to provide an improved fluid tight seal for sealing the joint between mating bodies subjected to high fluid pressures.

Another object is to provide an improved fluid tight joint between a frusto-conical body and its mating bore.

Another object is to provide a metal, pressure energized sealing ring for sealing the joint between two bodies having communicating bores subjected to high fluid pressures.

Another object is to provide a metal seal ring formed to fit in a groove surrounding a hole in the conical surface of a body.

These and other objects and advantages of the present invention will become apparent from the following description and accompanying drawings, in which:

FIG. 1 is an exploded perspective of a well head installation employing seal rings of the present invention.

FIG. 2 is an enlarged perspective of one of the metal seal rings used in the installation of FIG. 1.

FIG. 3 is an enlarged, central section through one of the valve assemblies illustrated in FIG. 1, showing seal rings in sealing position but prior to being energized by plastic under pressure.

FIG. 4 is an enlarged section taken along lines 4—4 of FIG. 2.

FIGS. 5, 6 and 7 are fragmentary sections, drawn to an enlarged scale, and illustrating the manner in which the seal ring of FIGS. 1-4 is conditioned for operation.

FIG. 8 is an enlarged fragmentary section of a modified form of the metal seal ring of the present invention.

FIGS. 9, 10 and 11 are fragmentary sections illustrating the manner in which the seal ring of FIG. 8 is conditioned for operation.

FIG. 12, is an enlarged fragmentary section of another modification of the metal seal rings of the present invention.

FIGS. 13, 14 and 15 are fragmentary sections illustrating the manner in which the seal ring of FIG. 12 is conditioned for operation.

The well head unit 10 shown in FIG. 1 includes two plug-in valve assemblies 11 and 12, the assembly 11 being locked in operative position in the main body or housing 13 of the well head unit 10 and the assembly 12 being withdrawn therefrom. The two assemblies 11 and 12 are of identical construction, and only the assembly 12 will be described herein.

The valve assembly 12 (FIGS. 1 and 3) comprises a tapering frusto-conical valve body 14 threaded externally at its small diameter end for receiving a nut 16 which, when tightened, locks the valve body 14 in fixed position in a complementary frusto-conical bore 17 extending transversely through the main body 13. A key 18 is fitted in aligned grooves in the mating surfaces of the valve body 14 and of the frusto-conical bore 17 and prevents rotation of the valve body 14 relative to the main body 13. The valve body 14 is bored axially to receive a rotatable valve plug 19 of any suitable type which is held within the housing by an end cap 20 screwed into the large diameter end of the valve body 14, as shown in FIG. 3. Although the cap 20 bears tightly against the end of the plug 19, the latter is free to turn within the body 14 without turning the cap 20. A transverse passageway 21 extending through the valve plug 19 is adapted to be selectively registered with aligned ports 22 extending through opposite walls of the valve body 14 to provide a flow passage between the ports 22, or to be moved to a position extending transversely of the ports 22 and out of communication therewith to prevent flow from one port 22 to the other. The ports 22 are held in registration with a flow passage 23 drilled through the main body 13 one end of which passage communicates with a source of fluid under pressure, whereas the other end of the passage 23 communicates with a suitable conduit (not shown) adapted to conduct the pressurized fluid to the desired destination.

A pair of grooves 24 and 26 (FIGS. 1 and 3) are formed in the outer frusto-conical surface of the valve body 14 concentric about each of the ports 22. The inner grooves 24 each receive a conventional O-ring 27, and the outer grooves 26 are each adapted to receive one of the metal seal rings 30 of the present invention. The grooves 26 are connected by passageways 31 (FIG. 3) to check valves 32, one of which is screwed into the outer end of each passageway 31 at the larger end of the body 14, and through which a semi-fluid plastic can be injected under high pressure.

Since the structures for and the manner of sealing the areas around both of the ports 22 are identical, the following description of the structure associated with the upper port (FIG. 1) and of the manner of sealing the area surrounding the same will suffice for both.

The metal seal ring 30 (FIGS. 2 and 4) is first machined in a flat plane and is then bent to fit in the groove 26. Thus, the ring 30 is curved to lie in a plane tapering about an axis offset laterally from the ring, as shown in FIG. 2, and conforming to the taper of the valve body 14. The seal ring 30 is of H-shaped cross section having an inner leg 33 and an outer leg 34 connected in spaced relation by a web 36. The web 36 is provided with a plurality of apertures 37 through which the plastic material can flow in the manner to be described. The outer leg 34 is chamfered to provide a relatively thin, tapered edge which will later be formed into the primary sealing lip 39 (FIG. 4) of the ring 30. Because of the H-shaped cross section of the ring 30 and because the ring is shaped to fit in a groove on a conical surface, the ring is quite rigid.

The metal ring 30 is fitted in the groove 26 as indicated in FIG. 5 with the legs 33 and 34 being taller than the depth of the groove 26 and, hence, projecting out of the groove 26 a short distance such as 0.015".

With the metal ring 30 fitted in the groove 26 and with the O-ring 27 fitted in the groove 24, the valve body 14 is moved into the frusto-conical bore 17 in the main body 13 and is locked in the position shown in FIG. 3 by the nut 16. When in this position, the outer portion of the inner leg 33 is compressed and flattened somewhat and the lip 39 is bent inwardly toward the center of the ring 30 by its engagement with the frusto-conical bore 17 to assume the cross sectional shape indicated in FIG. 6. The plastic material is then injected through the check valve 32 (FIG. 7) into the groove 26 between the legs 33 and 34 to fill substantially all the space in the groove 26 not occupied by the web 36. The plastic flows through the apertures 37 in the web 36 of the ring 30 and is under a static pressure which is preferably slightly greater than the pressure of the fluid to be sealed. This pressure may be on the order of 30,000 p.s.i. and is sufficient to positively seat the lip 39 of the ring 30 against the frusto-conical bore 17, and thus pre-energize the seal ring 30.

When fluid under high pressure flows in the passage 23 (FIG. 3) the O-ring 27 provides an initial fluid seal. If the O-ring 27 should fail, the fluid contacts the inner leg 33, and possibly the plastic material in the groove 26, and is prevented from flowing outwardly of the seal by the positive engagement of the lip 39 with the frusto-conical bore 17. If the pressure of the fluid being sealed exceeds the pressure of the plastic material, the force exerted on the inner leg 33 and on the plastic in the groove 26 is transmitted to the lip 39 to force the same into tighter engagement against the frusto-conical bore 17 to thereby strengthen the seal.

In the modification of the invention illustrated in FIGS. 8–11, the structure and mode of operation are the same as already described except that a simplified metal seal ring 51 is used in place of the metal seal ring 30 (FIG. 2). Those parts in the second modification of the invention which are identical to parts in the first modification will be assigned the same numerals followed by the suffix a, and only the differences between the two modifications will be described in detail.

The metal seal ring 51 (FIGS. 8, 9, 10 and 11) comprises a single annular leg 52 having a beveled outer edge which defines a sealing lip 53. The ring 51 is bent to fit into the groove 26a (FIG. 9) with the outer surface of the ring spaced radially inward a short distance from the outer wall 54 of the groove 26a. When seated in the groove 26a, the sealing lip 53 projects outwardly beyond the conical surface of the frusto-conical body 14a approximately 0.015″. When the frusto-conical body 14a is locked in position in the frusto-conical bore 17a, the metal seal ring 51 is bent as indicated in FIG. 10. Plastic under pressure is then directed into the groove 26a through the check valve 32a and the passage 31a, thereby pre-energizing the ring 51 causing the ring to be bent as indicated in FIG. 11 and moved into firm sealing engagement against the outer wall 54 of the groove 26a. The plastic material moves the sealing lip 53 into firm sealing engagement against the frusto-conical surface of the bore 17a.

The metal seal ring 51 is adapted to seal fluid under pressures of approximately 15,000 p.s.i. The fluid to be sealed will contact the plastic material and will add its pressure to that of the plastic material to more firmly seat the lip 53 in fluid tight engagement against the frusto-conical surface of the bore 17a.

The modification of the invention disclosed in FIGS. 12, 13, 14 and 15 is likewise similar to the first described form except that the metal ring 30 (FIG. 2) is replaced by a pair of cooperating metal O-rings 60 and 61. Parts in this modification of the invention which are equivalent to those in the first described form will be assigned the same numerals as those used in the first modification, followed by the suffix "b."

The pair of cooperating metal O-rings 60 and 61 (FIGS. 12, 13, 14 and 15) are each of circular cross-section and are bent to fit within the groove 26b with the larger ring 60 disposed a short distance from the larger diameter wall 62 (FIG. 13) of the groove 26b. Both rings 60 and 61 project outwardly beyond the conical surface of the frusto-conical body 14b approximately 0.015″. When the body 14b is moved into and is locked in operating position in the frusto-conical bore 17b, the metal O-rings 60 and 61 are flattened somewhat as indicated in FIG. 14. Plastic material under a pressure of approximately 30,000 p.s.i. is injected between the rings 60 and 61 into the groove 26b (FIG. 15) through the passageway 31b and check valve 32b. This plastic material slightly distorts the metal of the seal rings 60 and 61 and pre-energizes both rings by causing both rings to firmly seat in fluid tight engagement against the surface of the frusto-conical bore 17b to prevent leakage therepast. It is to be noted that pressure of the fluid being sealed acts on the inner ring 61 to more firmly seal the same against the bore 17b and that this pressure also acts through the plastic material to more firmly seal the outer ring against the bore 17b.

From the foregoing description it becomes apparent that the metal seal rings of the present invention are initially bent to conform to the shape of a frusto-conical surface. The metal rings are capable of being pre-energized by the injection of plastic material under high pressure into the ring groove thus forming a static seal adapted to effectively seal against leakage between interfitted, relatively immovable parts, and to resist unusually high fluid pressures.

While several embodiments of the present invention have been shown and described, it will be understood that further changes and modifications may be made therein without departing from the spirit of the invention or the scope of the appended claims.

Having thus described the present invention and the manner in which the same is to be used, what is claimed as new and desired to be protected by Letters Patent is:

1. In a fluid handling apparatus, a first body having a first mating surface, a fluid passageway opening through said first mating surface, and a groove circumscribing said passageway, said groove being defined by a bottom wall and spaced inner and outer walls projecting from said bottom wall to said first mating surface, said groove having a predetermined depth measured from said bottom surface to said first mating surface; a metallic sealing ring circumscribing said passageway and having a bottom portion positioned in said groove, said bottom portion having a bottom surface engaging said bottom wall, said ring having a deformable top portion integral with and projecting from said bottom portion, said top portion having a top surface, the dimension of said ring measured from said bottom surface to said top surface being greater than said depth of the groove; and a second body having a fluid passageway in registration with the passageway in said first body and a second mating surface mating tightly against said first mating surface and engaging said top portion of the ring, said ring being thereby held under compression between said bodies with said second body holding said top portion in a deformed position wherein it projects angularly from said bottom portion toward said passageways and wherein said top surface bears in fluid tight engagement against said second mating surface around said passageways, whereby fluid under pressure from said passageways entering between said mating surfaces and moving into said groove encounters said top portion of the ring and presses said top portion more tightly against said second mating surface.

2. The fluid handling apparatus of claim 1 including plastic material in said groove, said plastic material being held under pressure in the order of the pressure of fluid to be conducted in said passageways, said pressurized plastic material thereby urging said top portion against said second mating surface.

3. The fluid handling apparatus of claim 1 wherein said ring has an H-shaped cross section, said ring thereby providing an inner leg adjacent to said inner wall of the groove, an outer leg adjacent to the outer wall of said groove, and a web interconnecting said legs, said outer leg providing said bottom and top portions and being compressed and deformed between said first and second bodies.

4. The fluid handling apparatus of claim 3 wherein said web has perforations, and wherein plastic material is in said groove between the legs of said ring and filling the perforations in said web, said plastic material being held under pressure in the order of the pressure of fluid being conducted in said passageways and urging said top portion against said second mating surface.

5. The fluid handling apparatus of claim 1 wherein said ring has inner and outer surfaces respectively adjacent to said inner and outer walls of said groove, wherein the outer surface of said top-portion is frusto-conical and converges endwardly toward said inner surface of the top portion, and wherein said ring is concaved between said bodies with the outer surface of the ring being convex and engaging the outer wall of the groove and with the inner surface of the ring being concave.

6. In a fluid handling apparatus, a first body having a first mating surface, a fluid passageway opening through said first mating surface, and a groove circumscribing said passageway, said groove being defined by a bottom wall and spaced inner and outer walls projecting from said bottom wall to said first mating surface, said groove having a predetermined depth measured from said bottom surface to said first mating surface; a deformable metallic sealing ring circumscribing said passageway and having a bottom portion positioned in said groove, said bottom portion having a bottom surface engaging said bottom wall, said ring having a top portion integral with and projecting from said bottom portion, said top portion having a top surface, the dimension of said ring measured from said bottom surface to said top surface being greater than said depth of the groove; a second body having a fluid passageway in registration with the passageway in said first body and a second mating surface mating tightly against said first mating surface and engaging said top portion of the ring, said ring being thereby held under compression between said bodies and being deformed in a radial direction relative to said passageway wherein said top surface bears in fluid tight engagement against said second mating surface around said passageways; and plastic material in said groove and being held under pressure against said ring thereby forcing said top surface against said second mating surface, whereby fluid under pressure from said passageways entering between said mating surfaces and moving into said groove encounters said plastic material and the top portion of said ring and presses said top portion both directly and through pressure exerted against said plastic material more tightly against said mating surface.

7. The fluid handling apparatus of claim 6 wherein the ring has an H-shaped cross section in a plane radially related to said passageways and includes an outer leg providing said top and bottom portions and thereby being held under compression and radial deformation between said bodies, an inner leg adjacent to said inner wall of the groove, and a web interconnecting said legs.

8. The fluid handling apparatus of claim 6 wherein said ring has inner and outer surfaces respectively adjacent to said inner and outer walls of said groove, wherein the outer surface of said top portion is frusto-conical and tapered away from the bottom wall of the groove whereby with said ring being compressed between said bodies, said top portion is deformed radially inwardly toward said passageway.

9. The fluid handling apparatus of claim 6 wherein said ring is round in cross section.

References Cited in the file of this patent

UNITED STATES PATENTS

| | | |
|---|---|---|
| 1,157,956 | Osborne | Oct. 26, 1915 |
| 2,083,842 | Henning | June 15, 1937 |
| 2,548,128 | Snyder | Apr. 10, 1951 |
| 2,654,563 | Mueller | Oct. 6, 1953 |
| 2,747,600 | Laurent | May 29, 1956 |
| 2,852,226 | Wheatley | Sept. 16, 1958 |
| 2,858,847 | Collins | Nov. 4, 1958 |
| 2,952,437 | Knox | Sept. 13, 1960 |
| 2,986,374 | Rakus | May 30, 1961 |

FOREIGN PATENTS

| | | |
|---|---|---|
| 1,166,140 | France | June 16, 1958 |